United States Patent
Niedermoser

(10) Patent No.: US 12,296,507 B2
(45) Date of Patent: May 13, 2025

(54) KNURLED CALENDER ROLL, METHOD AND APPARATUS FOR FORMING THE KNURLED CALENDER ROLL AND GEOMEMBRANE PRODUCED BY THE KNURLED CALENDER ROLL

(71) Applicant: AGRU/AMERICA, Inc., Georgetown, SC (US)

(72) Inventor: Gunther Niedermoser, Murrells Inlet, SC (US)

(73) Assignee: Agru/America, Inc., Georgetown, SC (US)

( * ) Notice: Subject to any disclaimer, the term of this patent is extended or adjusted under 35 U.S.C. 154(b) by 137 days.

(21) Appl. No.: 17/850,872

(22) Filed: Jun. 27, 2022

(65) Prior Publication Data
US 2023/0415382 A1   Dec. 28, 2023

(51) Int. Cl.
*B29C 33/38* (2006.01)
*B29C 43/46* (2006.01)
*E02D 31/00* (2006.01)

(52) U.S. Cl.
CPC .......... *B29C 33/3842* (2013.01); *B29C 43/46* (2013.01); *E02D 31/004* (2013.01); *B29C 2043/465* (2013.01); *E02D 2300/0085* (2013.01)

(58) Field of Classification Search
CPC .......... E02D 2300/0085; E02D 31/004; B29C 2043/465; B29C 43/46; B29C 33/3842
See application file for complete search history.

(56) References Cited

U.S. PATENT DOCUMENTS

| | | | | |
|---|---|---|---|---|
| 3,389,466 A | * | 6/1968 | Parris | B44C 7/027 30/365 |
| 4,274,202 A | * | 6/1981 | Petrick | B44C 7/027 30/365 |
| 5,167,895 A | * | 12/1992 | Lueghamer | B29C 43/222 264/318 |
| 6,132,845 A | * | 10/2000 | Heinzlreiter | B29C 59/022 428/141 |

\* cited by examiner

*Primary Examiner* — Bayan Salone
(74) *Attorney, Agent, or Firm* — Gerald E. Hespos; Michael J Porco

(57) ABSTRACT

An apparatus is provided for forming recesses in a calender roll. The apparatus includes a rotational drive for rotating the calender roll around a rotational axis. The apparatus further includes a knurling wheel with knurling spikes projecting there from. The knurling wheel is rotatable about an axis that is aligned an acute angle to a plane that contains the rotational axis of the calender roll so that the knurling spikes produce a helical array of recesses in the outer surface of the calender roll. The calender roll then can be used to form a landfill liner with projections that are offset from one another to avoid having the projections form grooves and thereby preventing slippage of the landfill liner.

7 Claims, 3 Drawing Sheets

KNURLED CALENDER ROLL, METHOD AND APPARATUS FOR FORMING THE KNURLED CALENDER ROLL AND GEOMEMBRANE PRODUCED BY THE KNURLED CALENDER ROLL

BACKGROUND

1. Field of the Invention

The invention relates to a knurled calender roll that can be used to produce a geomembrane, such as a landfill liner. The invention also relates to a geomembrane that can be produced by the knurled calender roll and to a method and apparatus for producing the knurled calender roll to increase the interfacial shear strength of the geomembrane against adjacent both natural and/or geosynthetic surfaces. The invention further relates to a landfill liner.

2. Description of the Related Art

The disposal of waste material presents challenges to environmental engineers, landfill operators, and manufacturers of goods. In particular, waste materials must be stored and/or disposed of in a manner that protects the environment from contamination.

Many waste products can be treated to negate their environmental impact. Other waste materials cannot be treated immediately and must be held for a period of time in a holding area. Such holding areas include landfills for household trash, landfills for hazardous waste, mining leach pads and coal residual storage locations to name a few. These holding locations or landfills typically are lined with a sheet material that often is referred to as a geomembrane. The liner or geomembrane typically is formed from at least one resin material (e.g. HDPE, LLDPE, PP, but not limited to these two resin types) that is intended to prevent the waste products from leaching into the underlying soil and potentially contaminating ground water. Many landfills are lined with plural layers, and each layer is selected to perform a specified function. The lower and upper surface of a single or multi-layer liner often is roughened and/or formed with projections to engage with adjacent surfaces an opposed ground surface to prevent a sliding movement of the liner against these adjacent surfaces. In this regard, many landfills are upwardly open concavities with sloped sides, The waste material stored in the landfill will have a mass with a gravitational force component extending along the sloped ground surface of the landfill. These forces can cause the liner to slip toward the bottom of the landfill concavity, thereby creating the chance that some upper parts of the concavity will not be protected by the liner. Movement of the liner also can be caused by movement of the ground due to periodic freezing and thawing, seismic movement of the earth and/or forces generated by equipment during installation. The roughening or projections on the lower surface of the liner are intended to increase interfacial shear strength of the geomembrane to prevent sliding movement of the liner against its adjacent surfaces. Examples of liners with roughening or projections formed on the lower surface are shown in U.S. Pat. Nos. 5,167,895 and 6,132,845.

Increased concern about environmental protection have created a need for more land fill storage space. Additional volume can be achieved by providing deeper concavities for storing the waste. However, deeper storage spaces typically have more steeply sloped sides, thereby increasing the risk of the liner slipping gravitationally down the sloped surfaces.

Most landfill liners are long wide rectangular sheets that are extruded to produce sheets that often are about 7 meters wide and about 152 meters long, however the length of the sheet that can be rolled often will be dependent upon the thickness sheet material. The long sheets are passed through calender rolls that have a roughened surface or recesses. The roughening or recesses on the surface of the calender roll will form the mechanisms for generating interfacial shear strength of the sheet against adjacent surfaces. The recesses in the calender roll are formed in circular arrays of recesses with the circular arrays of recesses being spaced equal distances from one another along the length of the calender roll. The recesses in each circular array are spaced from one another by equal circumferential distances around the circumference of the calender roll. Thus, the recesses form a rectangular pattern of projections on the sheet with columns of projections extending parallel to the length of the sheet. The sheets are wound into a roll (e. g. 7 meters long) and are shipped to the installation site where the sheets are unwound and placed on the ground surface of the landfill. Plural sheets are unwound next to one another, and adjacent edge regions are fused or welded to one another. The assembly of fused or welded sheets forms a large rectangular array of projections facing that are intended create friction against adjacent surfaces and hence are intended to result in greater interface shear strength. However, this configuration creates the risk that small downhill movements of the sheets caused by gravity, freezing/thawing cycles, seismic movement and/or construction activities may create pathways or grooves, and each subsequent uphill projection will merely follow that pathway and result in reduced friction and subsequent decreased interface friction, thereby potentially causing failure.

An object of the subject invention to provide a calender roll that produces a landfill liner with enhanced ground gripping effect.

Another object is to provide a method and apparatus for producing such a calender roll that can produce a landfill liner with enhanced group gripping effect.

An additional object is to provide a calender roll that can be made in a cost-effective manner A further object is to provide a landfill liner with enhanced ground gripping effect.

SUMMARY OF THE INVENTION

A first aspect of the invention relates to a method and apparatus for forming a calender roll that can be used to form a geomembrane or liner that is particularly suitable for lining or covering a landfill site. The calender roll is a cylinder having a rotational axis and a cylindrical outer surface. The calender roll is rotatable about the rotational axis. The cylindrical outer surface of the calender roll is formed with surface discontinuities that will create a specified knurling pattern in the liner, as explained further herein.

The surface discontinuities are formed in the outer surface of the calender roll by at least one knurling tool. The knurling tool has at least one rigid support arm with an end cantilevered in a longitudinal direction toward the rotational axis of the calender roll. Thus, the longitudinal direction of the support arm is coincident with a radius of the calender roll. Additionally, the longitudinal direction of the support arm and the rotational axis of the calender roll define a plane. The cantilevered or free end of the support arm may have two parallel fingers that are spaced from one another. A knurling wheel is mounted rotatably to the end region of the support arm (e. g. between the fingers) and can rotate about an axis extending perpendicular to the extending direction of the support arm. The knurling wheel includes an outer circumferential surface, and knurling spikes project radially out from the outer circumferential surface of the knurling wheel. In some embodiments, each knurling spike has a conical shape with a well-defined point. At least outer circumferential surface areas of the knurling wheel are formed from a very hard metallic material, and particularly a material that exhibits significantly greater hardness than the outer circumferential surface of the calender roll. In some embodiments, at least the outer circumferential surface regions of the knurling wheel are formed from a carbide steel.

The knurling tool is configured so that the support arm of the knurling tool extends along a radius of the calender roll. The knurling tool is configured and operative to move the support arm along the longitudinal direction of the support arm selectively toward and away from the calender roll and in some embodiments is configured and operative to adjustably rotate the support arm about its longitudinal direction or axis, thereby changing the orientation of the rotational axis of the knurling wheel and hence changing the alignment of the rotational axis of the knurling wheel to the rotational axis of the calender roll.

The position and orientation of the knurling wheel may be defined with respect to the rotational axis of the knurling wheel. In this regard, the rotational axis of the knurling wheel is aligned at an acute angle to a plane that contains both the longitudinal direction or axis of the support arm and the longitudinal or rotational axis of the calender roll.

The knurling tool is used by mounting the calender roll on an apparatus, such as a lathe, that is capable of rotationally driving the calender roll about the longitudinal axis of the calender roll. Devices of this type are well known in the art. The knurling tool is positioned in proximity to the calender roll with the longitudinal direction of the support arm aligned to intersect the rotational axis of the calender roll at a right angle, thereby defining a plane. Additionally, the support arm of the knurling tool is mounted for movement parallel to the rotational axis of the calender roll.

The knurling tool is used by advancing the support arm along the axis of the support arm toward the outer circumferential surface of the calender roll so that the knurling spikes are forced into contact with the outer surface of the calender roll. Simultaneously, the calender roll is driven rotationally about the axis of the calender roll. This rotating movement of the calender roll will cause the knurling wheel to rotate about its rotational axis of the knurling wheel while the knurling spikes of the knurling wheel are urged sequentially into contact with the outer circumferential surface of the calender roll. These forces between the knurling wheel and the calender roll and the rotations of the calender roll and the knurling wheel will cause the very hard knurling spikes to make indentations in the significantly softer metal defining the outer circumferential surface of the calender roll. The knurling wheel need not be driven rotationally on the support arm. Rather, the contact of the knurling spikes with the outer circumferential surface of the rotating calender roll will cause the knurling wheel to rotate about the rotational axis of the knurling wheel. As a result, circumferentially adjacent knurling spikes will sequentially form recesses on the outer circumferential surface of the calender roll. The shape of each recess will be determined by the shape of the knurling spikes. However, the recesses in the calender roll will not for circular arrays that lie along planes that intersect the calender roll perpendicular to the rotational axis of the calender roll. Rather, the recesses formed by the knurling tool in the outer circumferential surface of the calender roll will form a helical pattern or helical array along the outer circumferential surface of the calender roll beginning from one longitudinal position on the calender roll and extending to a remote longitudinal position. The pitch of the helical pattern will be dependent upon the acute angular alignment of the rotational axis of the knurling wheel to the plane that contains both rotational axis of the calender roll and the longitudinal direction of the support arm of the knurling tool.

The knurling tool may have a single support arm with a single knurling wheel. However, some embodiments will have a knurling tool with plural support arms and a corresponding plurality of support wheels. Each support arm may be disposed in a different radial plane of the calender roll, or two support arms may be disposed in the same radial plane but at diametrically opposite positions so that the support arms point generally toward one another. Some embodiments could have more than two support arms and a corresponding number of knurling wheels with the support arms extending in radial planes that are angularly offset from one another. However, the angular alignment of the rotational axis of each knurling wheel to the plane that contains both the rotational axis of the calender roll and the longitudinal direction of the support arm will be identical to produce uniform helical arrays of knurling recesses in the calender roll. Embodiments that have plural support arms and plural knurling wheels can have the support arms and the corresponding support wheels offset from one another so that the helical pattern of recesses formed in the calender roll by one support arm and the corresponding knurling wheel will be offset axially from the helical pattern of recesses formed by each other knurling wheel. In other embodiments, the support arms and the corresponding knurling wheels may be disposed to produce recesses in the calender roll that lie in the same helical pattern on the calender roll. However, adjacent recesses in the helical pattern can be produced by different knurling wheels.

The calender roll produced by the apparatus and method described above is used by extruding a geomembrane or liner sheet and then urging that extruded sheet through a nip formed by the above-described calender roll and another calender roll that typically will have a smooth outer surface with no knurling recesses. Forces exerted by the calender roll with the one or more helical arrays of recesses will cause the resin of the geomembrane or liner to be urged into the recesses thereby forming conical projections on the surface of the liner. However, the helical pattern of the recesses will cause each projection to be offset from an adjacent projection in a direction orthogonal to the feeding direction of the liner through the nip between the calender rolls. The amount of the offset between adjacent projections will be a function of the helical pitch of the recesses in the knurling roll, which in turn will be a function of the angular alignment of the rotational axis of the knurling wheel to a radial plane of the calender roll, e.g. the plane that contains both the support arm of the knurling tool and the rotational axis of the calender roll.

The geomembrane produced by the above-described calender roll will be unrolled onto a ground surface or geosynthetic surface at a landfill site with the projections facing either up or down toward the ground surface, depending on the particular application or design. However, each projection on the liner will be offset in a width direction of the liner relative to the next projection in the longitudinal direction of the liner. As a result, any movement of the liner along the ground surface of the landfill site will not create a pattern that can accommodate the next projection in the longitudinal direction of the liner and that could decrease the interfacial shear strength of the system.

DETAILED DESCRIPTION

Figure 1:
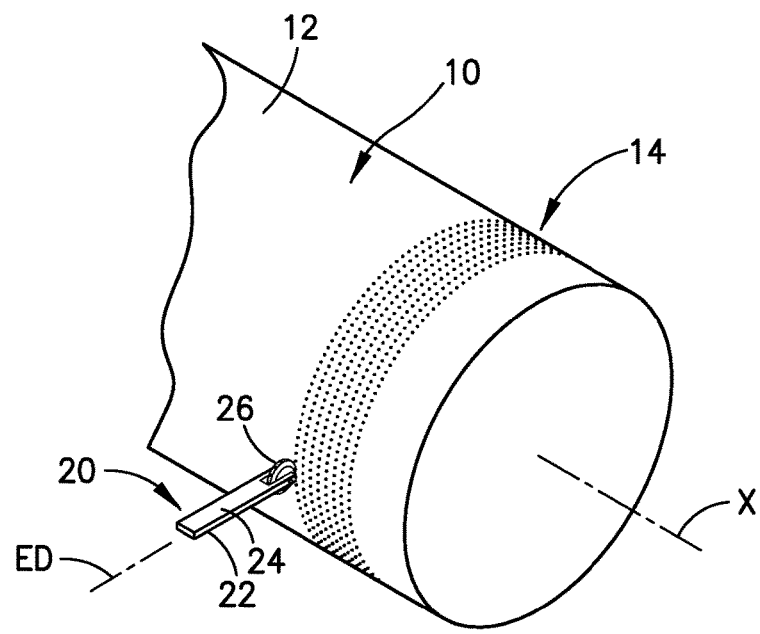
FIG. 1 is perspective view of a calender roll and a knurling tool in accordance with an embodiment of the invention.

A calender roll in accordance with an embodiment of the invention is identified generally by 10 in FIGS. 1-5. The calender roll 10 is a cylindrical structure with a longitudinal axis X and a cylindrical outer surface 12 substantially concentric with the axis X. Areas of the calender roll 10 adjacent the cylindrical outer surface 12 are formed from mild low carbon steel with a hardness typically less than 135 BHN (Brinell Hardness). However, aluminum, brass or other soft metal or certain nonmetals can be used. The outer cylindrical surface 12 of the calender roll 10 is provided with knurling recesses 14 arranged in a specific pattern, as explained further herein. Opposite ends of the calender roll 10 can be mounted in an apparatus 16 (FIG. 3) that is operative to rotate the calender roll 10 about the longitudinal axis X. Rotating devices for calender rolls can be large lathe machines and are very well known in the art.

The calender roll 10 is used with a knurling apparatus 20 that is configured to form the knurling recesses 14 in the outer cylindrical surface 12 of the calender roll 10. The knurling apparatus 20 includes at least one knurling tool 22 that has a rigid support arm 24 extending coincident with a radial direction from the rotational axis X of the calender roll 10. Thus, the extending direction of the support arm 24 and the rotational axis X of the calender roll 10 define a plane. The leading end 26 of the support arm 24 of the illustrated embodiment is forked to define two parallel spaced apart fingers 28. A knurling wheel 30 is mounted rotationally between the fingers 28 of the support arm 24 for rotation about a rotational axis 32 that passes through the fingers 28 and is aligned perpendicular to the extending direction of the support arm 24. The support arm 24 can be rotated about its longitudinal axis (longitudinal direction), and hence about a radius of the calender roll 10. Accordingly, the rotational axis 32 of the knurling wheel 30 will intersect the plane that contains both the rotational axis X of the calender roll 10 and the extending direction of the support arm 24. The angle of intersection of the rotational axis 32 of the knurling wheel 30 and the plane that contains bother the rotational axis X of the calender roll 10 and the longitudinal direction of the support arm 24 typically will be in a range of 1°-5°.

The knurling wheel 30 includes an outer circumferential surface 34 that is concentric with the rotational axis 32 of the knurling wheel 30. Knurling spikes 36 project radially out from the outer circumferential surface 34 of the knurling wheel 30 to define a radial projecting dimension from the circumferential surface of the knurling wheel 30 in the range of 0.5-2.0 mm. Each knurling spike 36 in the illustrated embodiment is substantially conical to terminate at a well-defined point. However, other spike configurations are possible including pyramidal spikes or rounded spikes. The knurling spikes 36 are spaced at equal circumferential distances from one another on the outer circumferential surface 34 of the knurling wheel 30. The circumferential distance between adjacent knurling spikes 36 in some embodiments is about 2.5-7 mm, with a spacing of about 4.5 mm in one exemplary embodiment. Outer circumferential regions of the knurling wheel 30, including the knurling spikes 36 are formed from a metal material, such as a carbide steel, cemented carbide, tungsten carbide or other carbide materials or tool steel with diamond or other precious stone tips so that the spikes 36 are significantly harder than the metal material that forms the outer cylindrical surface 12 of the calender roll 10.

The support arm 24 of the knurling tool 22 lies in a plane that extends through the axis X of the calender roll 10 and coincides with a radius r of the calender roll 10. However, the support arm 24 is rotated about its own longitudinal axis so that the rotational axis 32 of the knurling wheel 30 is aligned at an acute angle $\alpha$ to the plane that contains both the axis X of the calender roll 10 and the extending direction of the support arm 24. The angle $\alpha$ typically will be in a range of 1°-5°, and is 2.5° in one exemplary embodiment. The particular angle $\alpha$ may be determined in accordance with the radius r of the calender roll 10, characteristics of the liner produced by the calender roll 10, as well as characteristics of the landfill site at which the liner will be used.

Figure 2A:
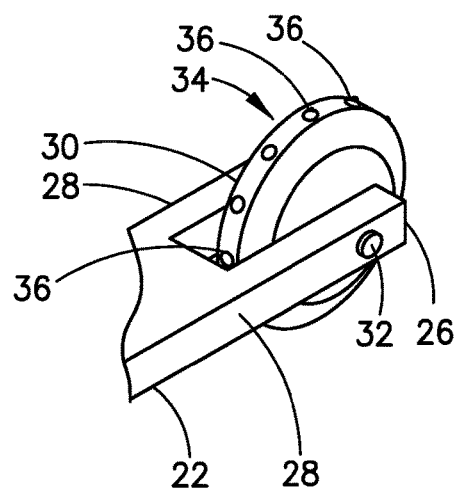
FIG. 2A is an enlarged perspective view showing the knurling tool and FIG. 2B is a cross-sectional view taken through the support arm of the knurling tool and showing the angular alignment of the rotational axis of the knurling tool relative to the longitudinal axis of the calender roll.
Figure 2B:
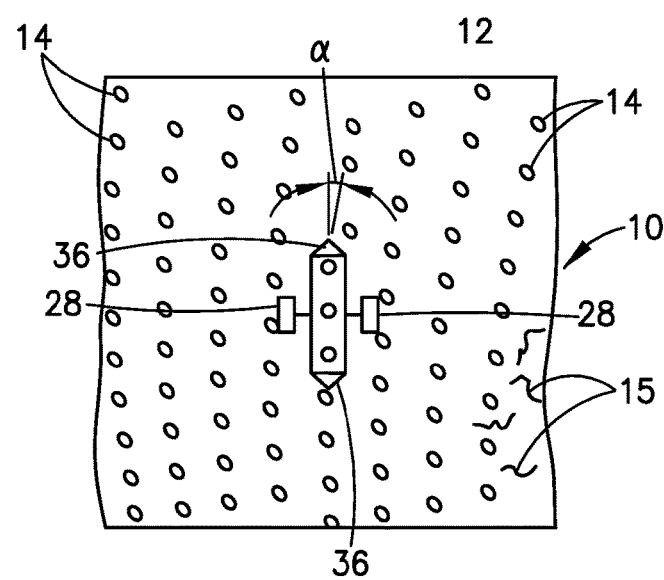
Figure 3:
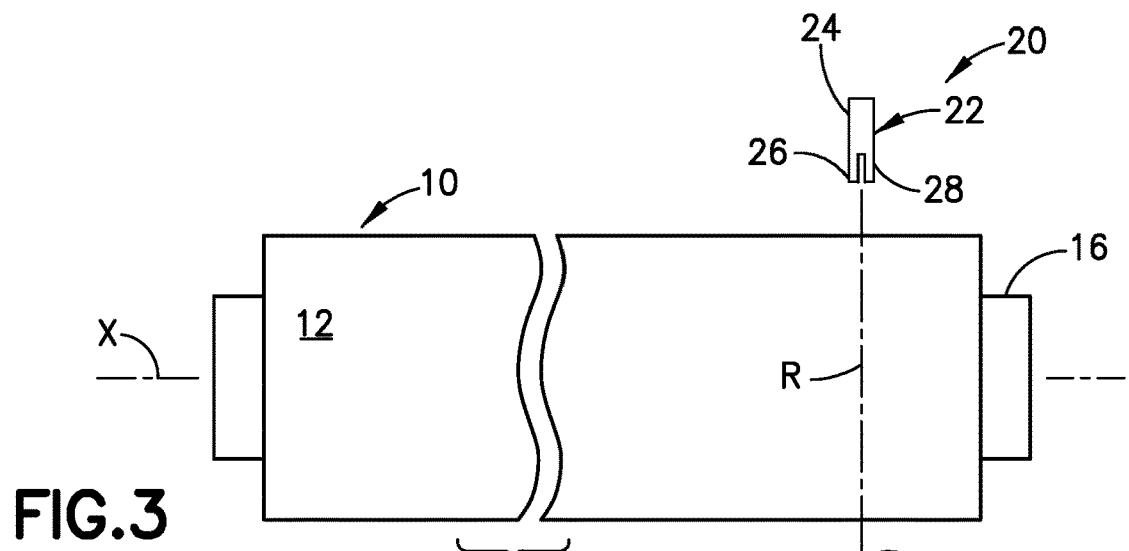
FIG. 3 is an elevational view of the calender roll and showing the alignment of the knurling tool with a radius of the calender roll.
Figure 4:
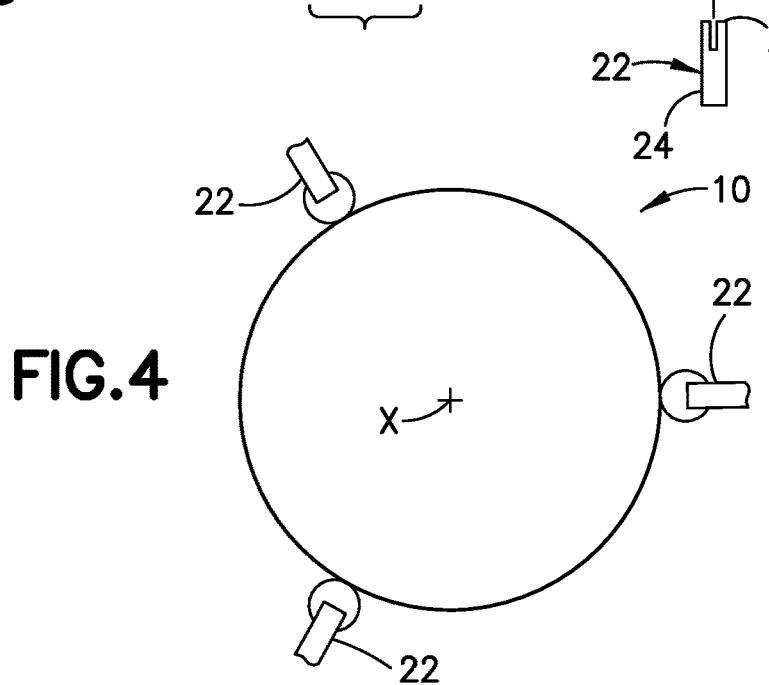
FIG. 4 is an end in view of the calender roll showing the alignment of the knurling tools to a radial plane of the calender roll.
Figure 5:
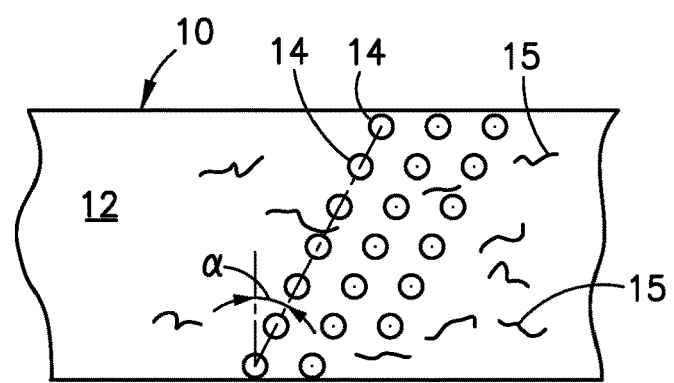
FIG. 5 is a side elevational view of the calender roll.

Some embodiments may have a knurling apparatus 20 with a single knurling tool 22, as shown in FIGS. 1 and 2. However, other embodiments of the knurling apparatus 20 may have two or more knurling tools 22, such as the two knurling tools 22 shown schematically in FIG. 3 or the three knurling tools 22 illustrated schematically in FIG. 4. Embodiments of the knurling apparatus 20 with plural knurling tools 22 will generally have the knurling tools 22 at substantially equal circumferential spacings about the axis X of the calender roll 10. Additionally, the axial direction x of each support arm 24 will all be aligned along radii r of the calender roll 10.

The knurling wheel 30 of each knurling tool 22 is rotatable between the fingers 28 of the support arm 24, but need not be driven rotatably by any part of the knurling apparatus 20. Rather, the knurling wheel 30 is rotated by forces exerted by the rotating calender roll 10. On the other hand, the knurling apparatus 20 is operative to move the knurling tool 22 toward and away from the calender roll 10 along the axial direction of the support arm 24. Additionally, the knurling apparatus 20 is operative to move the knurling tool 22 or the knurling tools 22 parallel to the axis X of the calender roll 10.

The knurling apparatus 20 forms the calender roll 10 by initially positioning the calender roll 20 in a rotatable drive device, such as a lathe machine, that is in proximity to the knurling apparatus 10. The calender roll 10 then is rotated about the longitudinal axis X, and the knurling apparatus 20 advances the knurling tool 22 toward the outer circumferential surface 12 of the calender roll 10 with the longitudinal direction of the support arm 24 aligned along a radius r of the calender roll 10. As noted above, the outer circumferential surface of the knurling wheel 30, and specifically the knurling spikes 36 thereof, are formed from a metal material that is significantly harder than the outer peripheral surface 12 of the calender roll 10. As a result, the knurling spikes 36 will displace the softer material of the calender roll 10 thereby forming knurling recesses 14 in the outer peripheral surface 12 of the calender roll 10. In the illustrated embodiment, the knurling spikes 26 are conical, and accordingly the knurling recesses 14 will be conical. The knurling wheel 34 rotates in response to forces generated by the rotation of the calender roll 10 while in engagement with the knurling spikes 26 on the outer periphery of the rotatable knurling wheel 24. The angular alignment of the rotational axis of the knurling wheel 30 to the plane that contains both the rotational axis X of the calender roll 10 and the longitudinal direction of the support arm 24 will cause the knurling recesses 14 to be arranged in a helical array with the knurling apparatus 20 moving parallel to the axis X of the calender roll 10 to define the pitch of the helical array. The knurling recesses 14 are spaced at equal circumferential distances of about 2.5-7 mm from one another on the outer circumferential surface 12 of the calender roll 10 with a circumferential spacing of about 4.5 mm in one exemplary embodiment. Dimensions between knurling recesses measured parallel to the axis X of the calender roll 10 typically will be in a range of 2-6 mm with an axial spacing of about 4 mm in some embodiments. The outer surface 12 of the calender roll 10 may have other surface discontinuities between the knurling recesses 14 to perform a general roughening. However, the predominant surface discontinuities 15 in the outer circumferential surface 12 of the calender roll 10 will be the knurling recesses 14.

Figure 6:
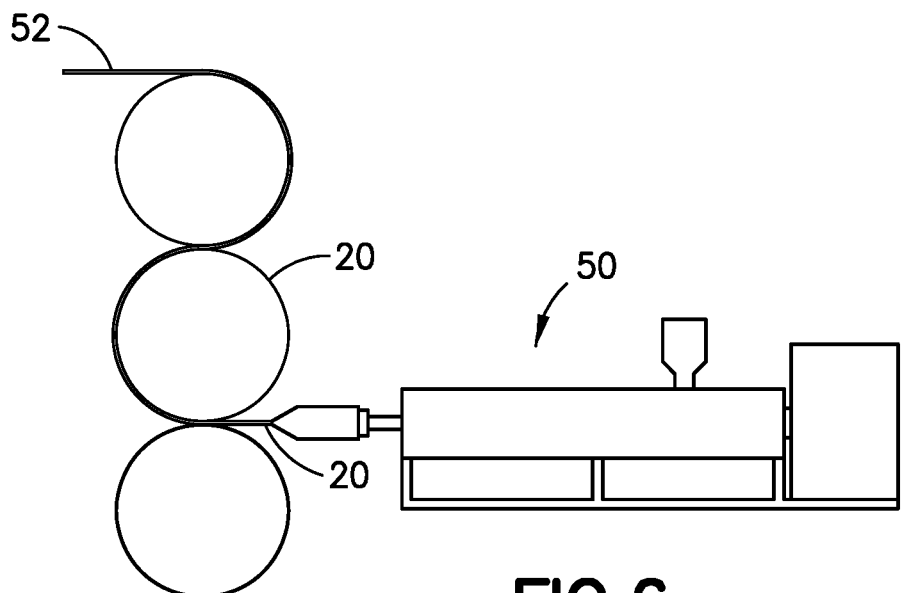
FIG. 6 is a schematic illustration showing the calender roll of the invention producing a liner.

The calender roll 10 with the knurling recesses 14 formed therein is used in the manner illustrated schematically in FIG. 6. In particular, an extrusion apparatus 50 extrudes a resin sheet 52 having a length L extending in the extruding direction 54 and a width extending parallel to the longitudinal axis X of the calender roll 10. Forces generated at the nips between the calender roll 10 and the adjacent rollers 56, 58 will urge the resin of the extruded sheet 52 of liner material into the knurling recesses 14, thereby forming conical projections 54 projecting from the surface of the sheet 52. However, the knurling recesses 14 are arranged in a helical pattern on the outer surface 12 of the calender roll 10. As a result, the conical projections 54 on the surface of the sheet 52 will not extend parallel to the length L direction of the sheet 52 but rather will be arranged so that each subsequent conical projection 54 is offset laterally with respect to the previously or subsequently formed conical projections 54, as illustrated most clearly in FIG. 7. The conical projections that are adjacent in the length direction L are offset from one another by an angle to the longitudinal direction of about 1°-5°, and is about 2.5° in one exemplary embodiment. The spacing b between the projections 54 in the width direction W of the sheet 52 typically is in a range of 2-6 mm, and is about 4 mm in one exemplary embodiment. The spacing c between the projections 54 in the length direction of the sheet 52 typically is in a range of 2.5-7.0 mm, and is about 4.5 mm in one exemplary embodiment. The random lines 60 on the sheet in 52 in FIG. 7 represent random roughening caused by surface discontinuities 15 in the calender roll 10 other than the knurling recesses 14

Figure 7:
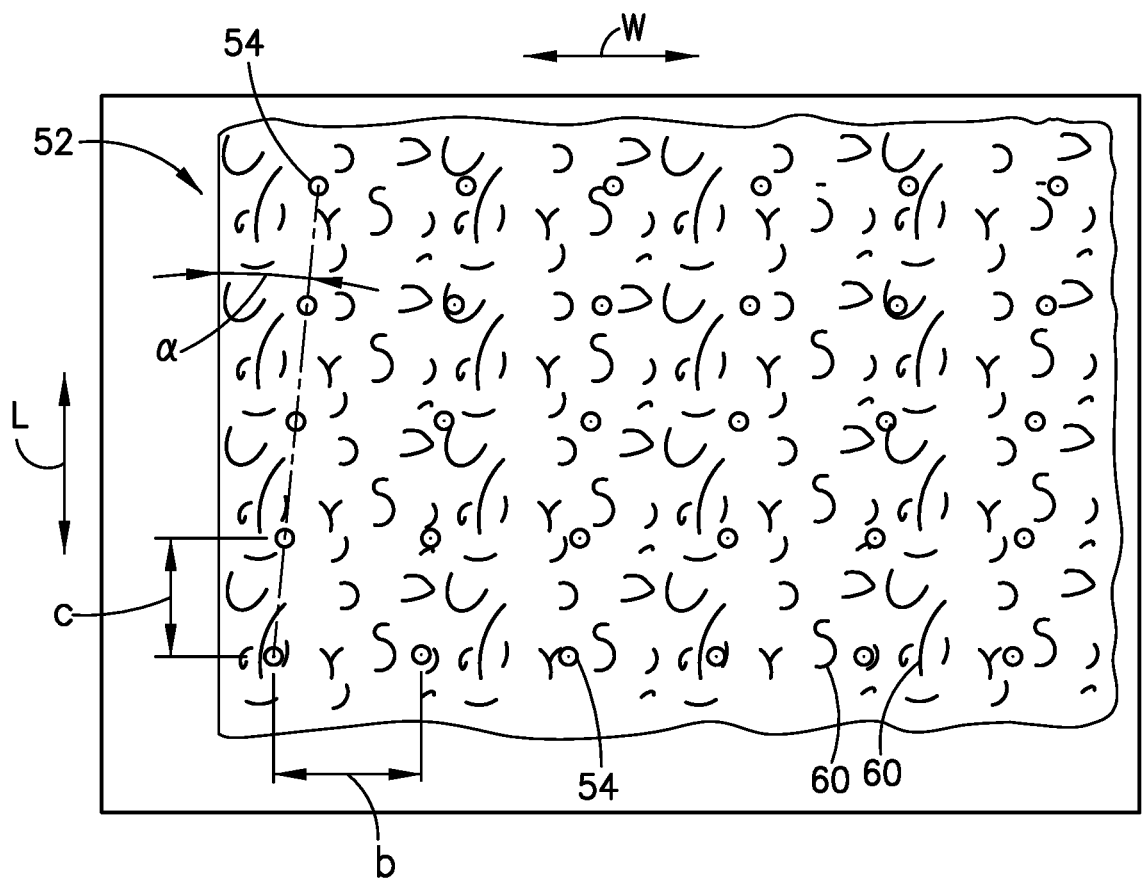
FIG. 7 is a top plan view of a liner produced by the calender roll of the invention.

The sheet 52 shown in FIG. 7 is rolled and transported to an installation site, such as a landfill. Each sheet 52 is unrolled so that adjacent sheets 52 are in substantially edge-to-edge or slightly overlapping relationship with one another and are fused or welded to one another at their respective edges. The conical projections 54 described above face toward the ground surface over which the liner sheets 52 are installed. The conical projections 54 do not align with one another in the length direction of the sheet 52. As a result, any sliding movement of the liner sheets 52 in response to gravitational or other forces will not cause any projection 54 to form a groove that will be followed by subsequent projections 54. As result, the liner 52 will exhibit very secure retention capabilities even on steep slopes.

While the invention has been described with respect to certain preferred embodiments, it is understood that the scope of the invention is not limited to these embodiments.

What is claimed is:

1. An apparatus for forming recesses in a calender roll, the calender roll having a longitudinal axis and an outer circumferential surface concentric with the longitudinal axis, the apparatus comprising:
   a rotating mechanism configured for rotating the calender roll around the longitudinal axis of the calender roll; and
   a knurling apparatus having at least one knurling tool with a support arm that is movable toward and away from the outer circumferential surface the calendar roll, a knurling wheel that has an outer circumferential surface with a plurality of knurling spikes projecting radially outward thereon, the knurling wheel being rotatable about a knurling wheel rotational axis that is aligned perpendicular to an extending direction of the support arm and at an acute angle to a plane that contains both the rotational axis of the calender roll and the extending direction of the support arm, the knurling apparatus being configured for moving the outer circumferential surface of the knurling wheel into contact with the outer circumferential surface of the calender roll so that the knurling spikes form recesses in the outer circumferential surface of the calender roll with the recesses defining a helical array along the outer circumferential surface of the calender roll.

2. The apparatus of claim 1, wherein the support arm is movable toward and away from the outer circumferential surface of the calender roll along a moving direction that passes through the rotational axis of the calender roll.

3. The apparatus of claim 2, wherein the moving direction of the support arm toward and away from the calender roll is carried out with the support arm being aligned along a radius of the calender roll, the support arm and the rotational axis of the calender roll defining a plane, the knurling wheel rotational axis intersecting the plane defined by the support arm and the rotational axis of the calender roll at an acute angle.

4. The apparatus of claim 1, wherein the outer circumferential surface of the knurling wheel is formed from a material that is harder than the outer circumferential surface of the calender roll.

5. A calender roll having a rotational axis and an outer circumferential surface concentric with the rotational axis, the outer circumferential surface having a plurality of recesses arranged in a helical array on the outer circumferential surface of the calender roll.

6. The calender roll of claim 5, wherein the recesses are conical recesses.

7. A method for forming a calendering surface on a calender roll, the method comprising:
- providing a calender roll having a calendar roll rotational axis and an outer circumferential surface concentric with the rotational axis;
- providing a knurling wheel mounted for rotation about a knurling wheel rotational axis that is aligned at an acute angle to the calender roll rotational axis, the knurling wheel having an outer circumferential surface formed with knurling spikes projecting outward thereon;
- rotating the calender roll about the calender roll rotational axis;
- moving the knurling wheel toward the outer circumferential surface of the calender roll along a radius of the calender roll while the calender roll is being rotated about the calender roll rotational axis so that the rotation of the calender roll about the calender roll rotational axis causes a rotation of the knurling wheel about the knurling wheel rotational axis; and
- moving the knurling wheel parallel to the calender roll rotational axis so that the knurling spikes form a helical array of knurling recesses in the outer circumferential surface of the calender roll.

* * * * *